US012759120B2

(12) United States Patent
Brechenmacher

(10) Patent No.: US 12,759,120 B2
(45) Date of Patent: Oct. 13, 2026

(54) TORQUE WRENCH EQUIPPED WITH A TIGHTENING ANGLE MEASUREMENT SENSOR

(71) Applicant: ATLAS COPCO INDUSTRIAL TECHNIQUE AB, Stockholm (SE)

(72) Inventor: Uwe Brechenmacher, Baiersbronn (DE)

(73) Assignee: ATLAS COPCO INDUSTRIAL TECHNIQUE AB, Stockholm (SE)

( * ) Notice: Subject to any disclaimer, the term of this patent is extended or adjusted under 35 U.S.C. 154(b) by 265 days.

(21) Appl. No.: 18/577,352

(22) PCT Filed: Jul. 6, 2022

(86) PCT No.: PCT/IB2022/056237

§ 371 (c)(1),
(2) Date: Jan. 8, 2024

(87) PCT Pub. No.: WO2023/281411

PCT Pub. Date: Jan. 12, 2023

(65) Prior Publication Data

US 2024/0181611 A1 Jun. 6, 2024

(30) Foreign Application Priority Data

Jul. 8, 2021 (IT) ........................ 102021000017990

(51) Int. Cl.
*B25B 23/142* (2006.01)
*G01L 5/00* (2006.01)

(52) U.S. Cl.
CPC ........ *B25B 23/1425* (2013.01); *G01L 5/0042* (2013.01)

(58) Field of Classification Search
CPC ....... G01L 25/003; G01L 5/24; G01L 1/2256; G01L 5/0042; G01L 3/00; G01L 1/225;
(Continued)

(56) References Cited

U.S. PATENT DOCUMENTS 7,565,844 B2 * 7/2009 Crass .................. B25B 23/1425 73/862.21
10,836,020 B2 * 11/2020 King ...................... B25G 1/063
(Continued)

FOREIGN PATENT DOCUMENTS

EP 1022097 A2 * 7/2000 ......... B25B 23/0035
EP 2326464 A1 6/2011
WO 2012069936 A1 5/2012

*Primary Examiner* — Andre J Allen
(74) *Attorney, Agent, or Firm* — Dickinson Wright PLLC; Andrew D. Dorisio

(57) ABSTRACT

Torque wrench provided with a tightening angle measurement sensor comprising a body (11), containing control circuits and an electronic processing unit having a handle (12) at one end for gripping by an operator who performs the tightening, and an arm (13) at the other end, said arm, at its free end, comprises a seat (16) in which there are alternatively engageable a plurality of inserts suitable for engaging the tool with a corresponding type and/or size of a mechanical member on which the tool is intended to act to perform a tightening operation, there being a gyroscope for measuring the tightening angle on said arm. The electronic processing unit of the wrench of means for compensating for deviations in the value of the received angle signal of the gyroscope, based on a compensation algorithm that corrects the value of the zero angle signal received from the gyroscope.

10 Claims, 6 Drawing Sheets

(58) Field of Classification Search
CPC ......... G01L 25/00; G01L 3/10; G01L 5/0066; G01L 1/14; G01L 3/108; G01L 1/00; G01L 3/22; G01L 5/00; G01L 5/1627; G01L 1/16; G01L 5/06; G01L 1/22; G01L 1/2206; G01L 17/00; G01L 5/0033; G01L 5/0038; G01L 5/0076; G01L 1/10; G01L 1/2262; G01L 1/242; G01L 3/101; G01L 3/106; G01L 3/1457; G01L 3/24; G01L 5/221; G01L 5/246; G01L 5/26; G01L 5/28; G01L 5/288; B25B 23/1427; B25B 23/1425; B25B 21/005; B25B 23/14; B25B 23/1422; B25B 23/142; B25B 21/00; B25B 23/141; B25B 13/463; B25B 23/145; B25B 23/147; B25B 23/0078; B25B 23/00; B25B 23/0007; B25B 13/48; B25B 13/46; B25B 23/1456; B25B 21/004; B25B 13/462; B25B 13/06; B25B 23/0035; B25B 13/00; B25B 23/16; B25B 13/465; B25B 21/02; B25B 23/15; B25B 21/002; B25B 23/0028; B25B 13/481; B25B 23/1453; B25B 13/50; B25B 17/02; B25B 23/0021; B25B 13/04; B25B 21/008; B25B 13/08; B25B 17/00; B25B 15/04; B25B 29/00; B25B 13/02; B25B 13/461; B25B 23/1415; B25B 23/0042; B25B 23/18; B25B 13/18; B25B 23/0014; B25B 15/001; B25B 19/00; B25B 21/007; B25B 13/14; B25B 13/467; B25B 27/00; B25B 13/56; B25B 13/58; B25B 15/02; B25B 23/0057; B25B 23/12; B25B 23/1405; B25B 13/065; B25B 13/102; B25B 13/107; B25B 13/466; B25B 13/52; B25B 15/008; B25B 21/026; B25B 23/105; B25B 27/04; B25B 13/24; B25B 13/44; B25B 27/0035; B25B 27/026; B25B 13/10; B25B 13/12; B25B 23/1475; B25B 27/16; B25B 11/00; B25B 15/00; B25B 23/108; B25B 27/14; B25B 13/5008; B25B 13/5016; B25B 23/0064; B25B 31/00; B25B 15/06; B25B 21/001; B25B 23/10; B25B 33/00; B25B 7/14; B25B 1/103; B25B 13/22; B25B 13/5041; B25B 23/0085; B25B 23/065; B25B 23/08; B25B 23/103; B25B 27/0042; B25B 27/02; B25B 27/24; B25B 1/18; B25B 1/2405; B25B 11/02; B25B 13/28; B25B 13/468; B25B 13/488; B25B 13/505; B25B 15/004; B25B 15/005; B25B 21/023; B25B 23/0071; B25B 23/02; B25B 27/0007; B25B 27/0028; B25B 27/143; B25B 29/02
See application file for complete search history.

(56) References Cited

U.S. PATENT DOCUMENTS

| | | | | |
|---|---|---|---|---|
| 2008/0127711 | A1* | 6/2008 | Farag | G01L 25/003 73/1.11 |
| 2010/0256929 | A1 | 10/2010 | Gharib | |
| 2023/0390904 | A1* | 12/2023 | Brechenmacher | B25B 23/1425 |
| 2025/0375860 | A1* | 12/2025 | Yang | B25B 23/1425 |

* cited by examiner

Fig. 5cont.
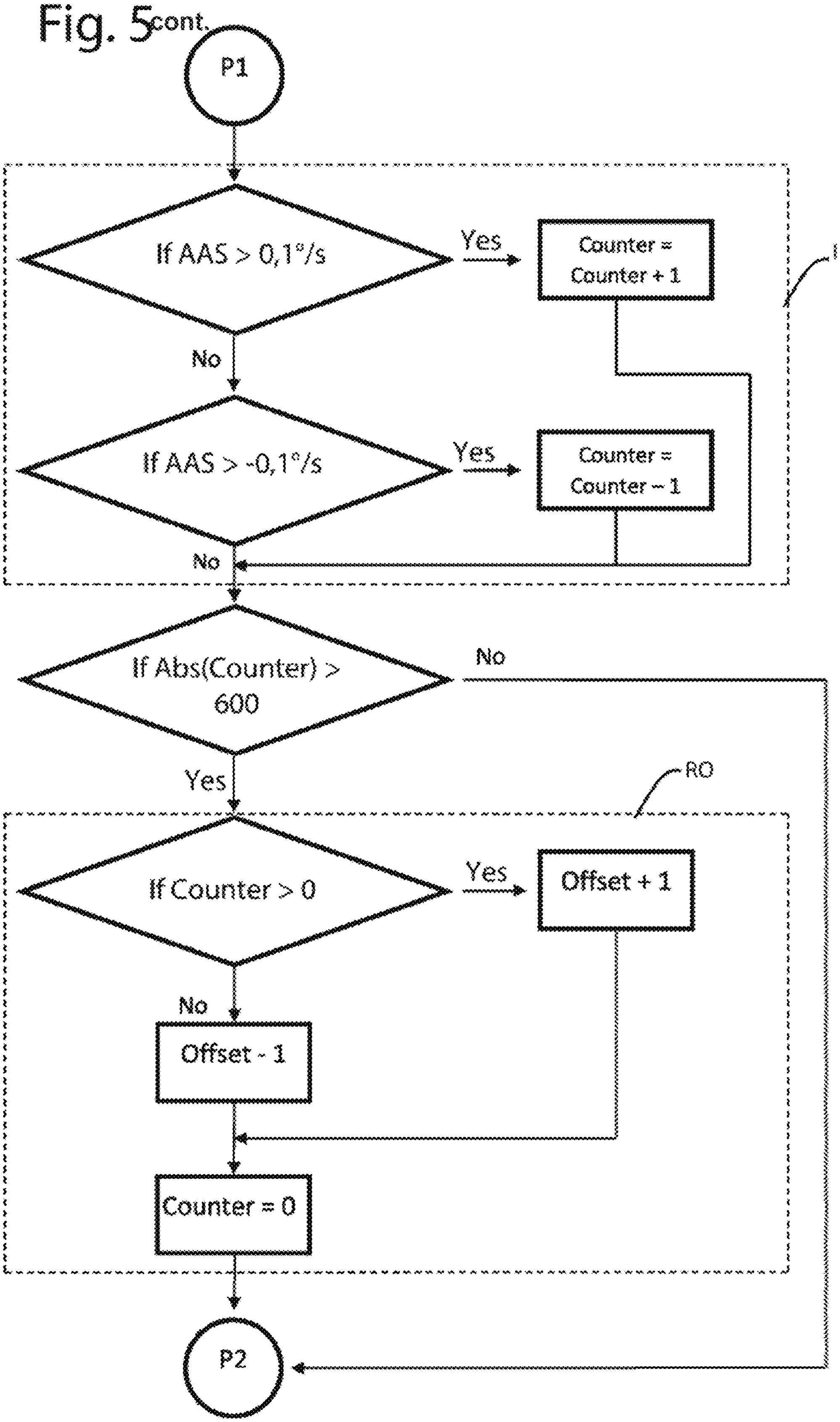

TORQUE WRENCH EQUIPPED WITH A TIGHTENING ANGLE MEASUREMENT SENSOR

TECHNICAL FIELD

The present invention relates to a torque wrench equipped with a tightening angle measurement sensor. In particular, the present invention relates to a torque wrench equipped with a gyroscope for measuring a tightening angle.

BACKGROUND

Tightening tools or wrenches are known in the art which comprise a body, containing the various control and, possibly, actuating members, to which one of several removable inserts is coupled, each of which is intended to engage a corresponding type of mechanical member (e.g., the head of a screw, with a male or female coupling) on which the tool is intended to act.

Electronic tools of this type include sensors, including a torque sensor, for detecting the torque exerted on the mechanical member and other quantities of interest, so as to allow a tightening of the mechanical member, which by means of appropriate sensors and processing means, shows the operator whether the desired tightening torque has been reached.

Such a tool is described in Patent EP2326464 in the form of a torque wrench, comprising a body, containing wrench control circuits and processing units, a handle (advantageously containing rechargeable batteries powering the wrench) on one side and an arm on the other side. There is advantageously a display on the body for displaying information and operating data and a keyboard for entering data and commands. There is interchangeably inserted, in a special seat at the end of the arm, a tool head that must be coupled with the type of mechanical member (for example, the head of a screw, with male or female coupling) on which the wrench is intended to act.

The sensors that measure the torque to be exerted on the member to be tightened are placed on the arm and include at least one strain gauge, which is a sensor whose electrical resistance varies with the deformation it undergoes; therefore, it converts force, pressure, tension, weight, etc. into a change in electrical resistance that can be measured.

The value of the exerted torque is normally available on the wrench display or it is indicated near it by means of appropriate light and/or acoustic signals. Signals from the sensors on the arm are transmitted to the central processing unit.

The tightening torque value is not the only parameter that determines whether the tightening has been done satisfactorily. In fact, there are other parameters and conditions that could be monitored to verify that the tightening tool is being used properly and to verify that the joint was tightened to the desired specifications.

Sometimes, to verify the proper functioning of a torque wrench, the tightening angle is also measured by means of a gyroscope with which the wrench is equipped. The tightening angle provides a lot of useful information about the tightening process, which allows understanding if the materials being tightened have been correctly coupled.

Normally, the accuracy of the measurements that the gyroscope takes is affected by temperature and other external factors. In fact, for gyrosensors, the environment in which it will be installed must be taken into account. For this reason, the Applicant has developed an algorithm to compensate for the effects of temperature changes related to the operating environment where the wrench is located.

SUMMARY

The present invention seeks to overcome this drawback by providing a torque wrench in which the gyroscope signal is further processed to compensate for the effects of temperature variations.

One aspect of the present invention relates to a torque wrench having the features of claim 1.

A further aspect of the present invention relates to a method for compensating for deviations in the angle signal measured by a gyroscope integrated in a torque wrench.

A further aspect of the present invention relates to a method for compensating for deviations in the angle signal measured by a gyroscope integrated in a torque wrench.

BRIEF DESCRIPTION OF THE DRAWINGS

Further purposes and advantages of the present invention will be clear from the following description and the accompanying drawings, which are provided as explanatory and non-limiting examples only, wherein.

DETAILED DESCRIPTION

Figure 1A:
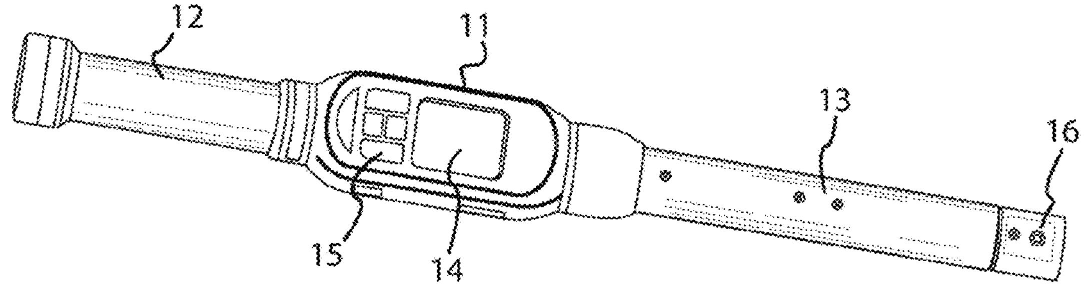
FIGS. 1*a*-1*e* show by way of example a torque wrench according to the present invention.
Figure 1B:
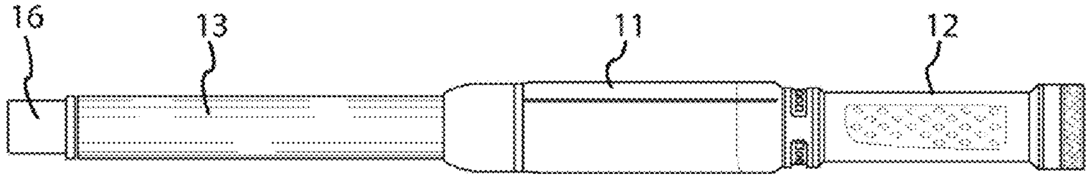
Figure 1C:
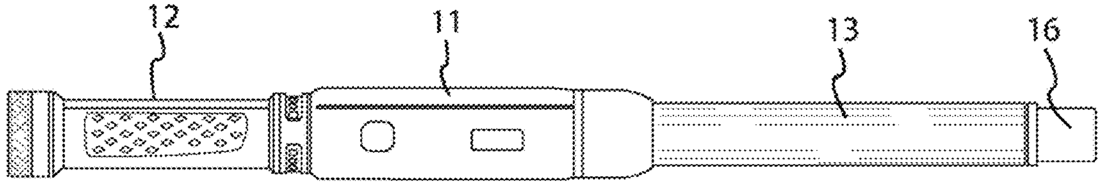
Figure 1D:
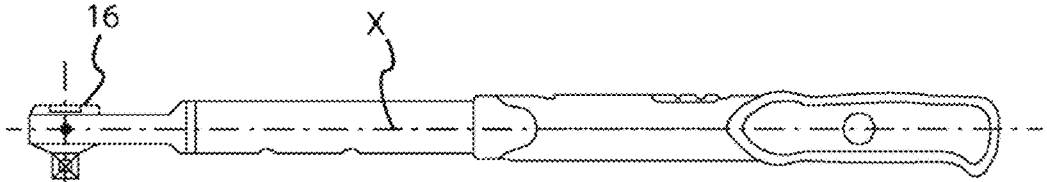
Figure 1D:
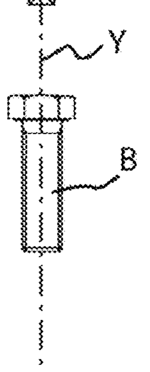
Figure 1E:
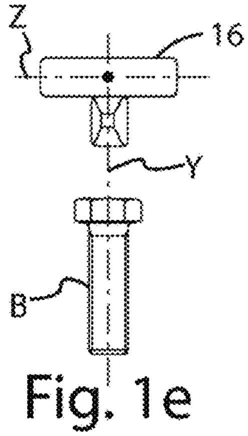

With reference to the aforementioned figures, the tightening tool according to the present invention is a torque wrench and comprises a body 11 containing electronic control circuits and a handle 12 (preferably containing rechargeable batteries for powering the tool) on one side of said body and an arm 13 on the other side.

On the body 11, there is advantageously a display 14 for displaying information and operating data and a special keyboard 15 allows data and commands to be entered.

Of course, it is understood that should the processing or storage of data require a unit that cannot be easily or completely contained in the body 11, the body 11 may be connected, by means of a cable or wireless connection, to external processing units. A wired connection can also be provided to provide external power.

A plurality of inserts are alternately engageable at a suitable seat 16 at the end of the arm 13. For example, each insert will be suitable to engage the wrench with a corresponding type and/or size of mechanical member or element (screw, nut, etc.) on which the tool is intended to act.

Although for simplicity all inserts shown are of a similar size, elongated inserts or inserts with specially shaped arms may be provided, as known in the field.

Each insert may comprise therein a transponder in a suitable position (typically in the engagement shank at the seat 16) to be coupled to a suitable antenna proximate to the seat 16 itself when mounted on the tool.

The coupling methods between transponder and antenna for the activation of the transponder (usually known as "tag") and communication are widely known and will not be described in detail here.

The tool includes sensors of the torque exerted on the mechanical member, made with strain gauge arrangements preferably arranged in the arm.

In addition, the wrench includes an angle sensor, such as a gyroscope, that is capable of measuring the angle of rotation of the wrench while performing a tightening operation.

The angle of rotation that the wrench performs during tightening is an important parameter for understanding if the tightening torque applied is the correct and set one.

The gyroscope typically measures rotational speed, therefore the angle of rotation is obtained by single integration.

Normally, when the wrench is stationary, the measured signal corresponds to a zero angle when the wrench is turned ON and the sensor zero is set, while the signal value increases when a rotation in one direction is performed (e.g. clockwise), while it decreases when a rotation in the other direction is performed (e.g. counterclockwise). The zero value is theoretically always in the middle of the maximum measurement scale of the sensor.

As already indicated, the accuracy of the measurements that the gyroscope takes are affected by external (particularly environmental) factors, such as changes in temperature or the force of gravity. In particular, the fluctuations of the value of the signal corresponding to zero angle, i.e. when the wrench is stationary (at rest) and active, are relevant.

Figure 2:
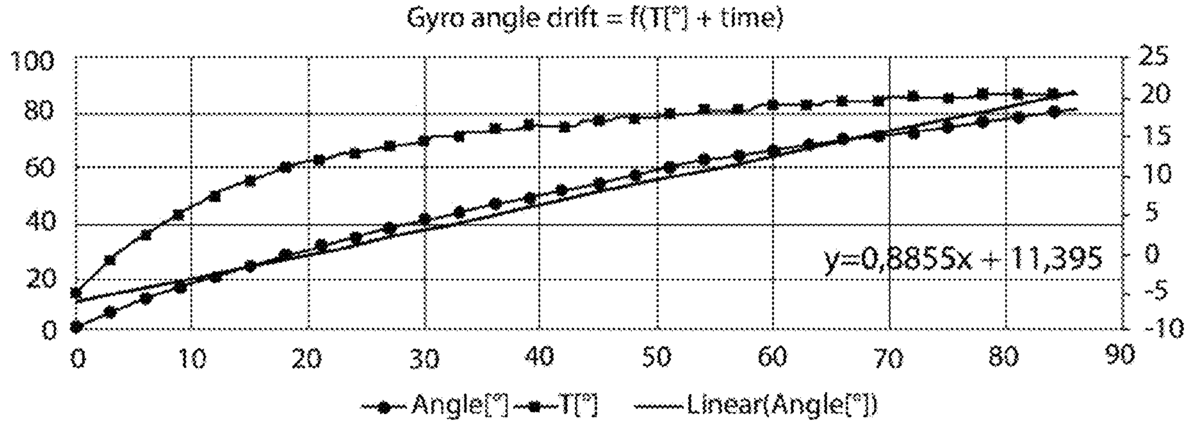
FIG. 2 shows a graph of the signal of a gyrosensor not compensated for in temperature.

The graph in FIG. 2 illustrates the measurements taken by a gyroscope not compensated for in temperature. In particular, measurements with angle oscillations from 10 to 80 degrees are received in an observation time of about 90 minutes and a temperature variation from about −5 to +20° C., with a theoretical angle measurement at 0° (wrench stationary).

This graph also shows that the factor corresponding to the angular coefficient of the straight line shows a variation of 0.8855°/min, which corresponds to 0.8855°/min*88 min=77.9° of deviation.

Thus, the present invention proposes to provide the electronic processing unit of the wrench with means for compensating for deviations in the value of the received angle signal of the gyroscope due to external factors, such as temperature variations, based on a compensation algorithm that corrects the value of the zero angle signal received from the gyroscope.

For the purposes of the present invention, an active wrench in a resting position means that the wrench is turned ON, is not charging connected to a charging device, and is not being held by an operator who is performing a tightening operation.

These means include a table of correspondence between temperature and the true zero angle signal provided by the gyroscope when the wrench is active and at rest.

In particular, the table stores the deviation between the received real zero signal and the theoretical one (in the middle of the measurement scale).

This table is obtained during a wrench calibration phase, in which the active and at rest wrench is subjected to temperature variations from a minimum to a maximum value and during this period, the angle signal is detected, which corresponds to the zero angle value since the wrench is stationary and does not rotate during the calibration phase.

In addition, the table can also be obtained or corrected by self-learning since the wrench is equipped with a temperature sensor and therefore can correct the table as it detects new values during normal use which differ from those initially set with a simple two-point calibration.

A suitable observation range of temperatures is between −10 and +30 degrees Celsius, more preferably between −5 and +25 degrees Celsius. Normally, a range referring to normal industrial conditions could also be between −10° and +40°.

The table is stored and then used to compare the angle value measured during tightening. By knowing the ambient temperature, since the wrench is normally equipped with a temperature sensor, or the gyroscope is also equipped with one, and knowing, from the table, how much the real zero signal differs from the theoretical one at that temperature, the angle value during compensated tightening is obtained.

Using a commercially available gyroscope such as the BOSCH 16-BIT model BIM055, we have a measurement range between 0 (in binary, sixteen bit string of 0's) and 65535 (in binary, sixteen bit string of 1's).

The gyroscope measures positive angles for clockwise rotations and negative angles for counterclockwise rotations, keeping zero in the middle of the range between 0 and 65535. Thus, the theoretical zero angle measurement is at 32767 (in binary 0111111111111111).

If when monitoring the raw signal of the gyroscope, in reality for example 32928 (in binary, 1000000010100000) is discovered, the deviation between the theoretical signal that should be received and the real one is 161.

This deviation varies as the temperature changes. The following table of correspondence summarizes the above.

| | |
|---|---|
| Bosch Gyroscope BMI055 - 16 Bit full scale | 65535 |
| Theoretically zero value | 32767 |
| Practically zero value | 32928 |
| Zero value | 161 |
| Full scale of angle rate [°/s] | 250 |
| **T[°C]** | **Zero offset [raw]** |
| −10 | 150 |
| −5 | 152 |
| 0 | 154 |
| 5 | 155 |
| 10 | 156 |
| 15 | 158 |
| 20 | 160 |
| 25 | 161 |
| 30 | 163 |

Deviations between 150 and 163 for temperature variations between −10 and +30 degrees Celsius are visible.

Therefore, during the tightening phase, it will be sufficient to subtract the value contained in the above table from the angle value received from the gyroscope at a given ambient temperature to obtain the correct rotation angle value during tightening.

Figure 3:
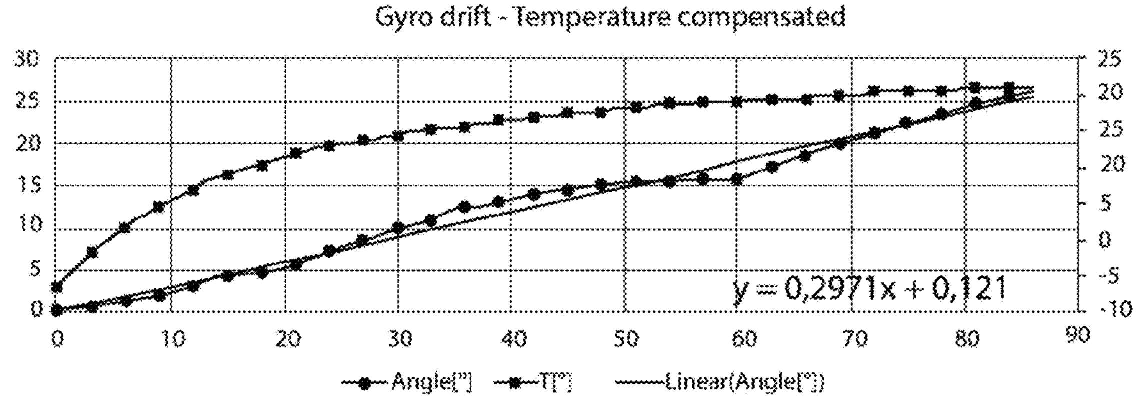
FIG. 3 shows a graph of the signal of a temperature-compensated gyrosensor being calibrated.

The graph in FIG. 3 illustrates a result of such compensation; it can be observed that in a similar observation time of about 90 minutes and a temperature variation from about −5 to +20° C., with a theoretical angle measurement at 0° (wrench stationary), measurements with angle oscillations from about 0 to 25 angle degrees are received. So the algorithm reduces the error, as compared to the graph in FIG. 1.

A method for compensating for deviations in the angle signal measured by a gyroscope integrated in a torque wrench when such a torque wrench is active includes the following steps:

- at least one calibration phase in which the wrench at rest and active is subjected to temperature variations from a minimum to a maximum value and during this period the gyroscope detects the angle signal, which corresponds to the zero angle value, and in which there is stored a table of correspondence between the measured angle values (offset T) and temperature detected, a tightening phase in which the signal stored in that table at the current temperature measured by the temperature sensor of the wrench or gyroscope is subtracted from the value of the angle signal received moment-by-moment from the gyroscope.

The present invention proposes a further improvement to such a compensation algorithm that realizes an instant-by-instant correction of the signal received from the gyroscope.

When the wrench is active and in resting condition (or waiting to take the measurement) these means monitor cyclically, at successive predetermined instants depending on the sampling rate of the gyroscope (instant i, i+1, i+2 . . . ), the zero signal of the gyroscope itself and in the face of a predetermined number of detected deviations of this signal as compared to the one previously detected above a predetermined threshold, reposition the zero of the gyroscope at the last value detected.

According to an aspect of the present invention, such means detect the signal from the gyroscope at predetermined instants, calculate whether there is a predetermined increment as compared to the previously acquired value. With each increment in the received signal, a counter is incremented. Similarly, with each decrease in the received signal, the counter is decreased.

When this counter exceeds this predetermined positive or negative counter threshold, the value corresponding to the zero angle is redefined by increasing the previously stored offset value and the counter is reset to zero.

This procedure repeats cyclically until the condition of the wrench at rest and active is changed, for example for the start of a tightening operation for turning OFF the wrench.

Figure 4:
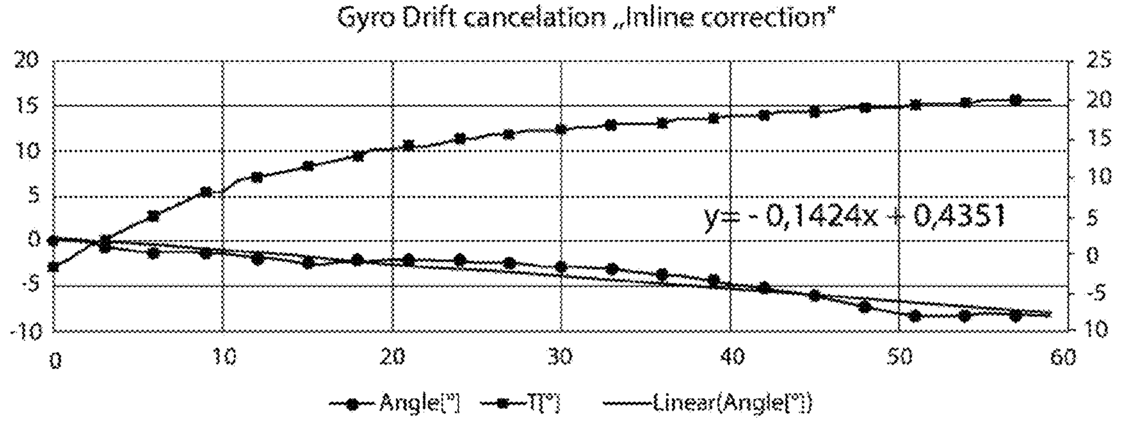
FIG. 4 shows a graph of the signal of a gyrosensor processed according to the present invention.

The graph in FIG. 4 shows the change in angle measured by the gyroscope after compensation with cyclic monitoring. As can be seen, the curve tends to be much flatter than those in FIGS. 2 and 3, as the changes in the measured angle are much smaller as compared to zero.

These correction means have the advantage of being external to the gyroscope and therefore can be applied to any type of gyroscope having an angle signal in digital form or that can be digitized.

The method for compensating for deviations in the angle signal measured by a gyroscope integrated in a torque wrench includes cyclically repeating the following steps as long as said torque wrench is active and at rest:

receiving, at predetermined instants, an angle signal from the active gyroscope which corresponds instant-by-instant to the zero angle signal, incrementing a counter when an increase in the received angle signal value is greater than a pre-set increment threshold, and decrementing the same counter when a decrement in the received angle signal value is greater than a pre-set decrement threshold, if the counter exceeds a positive upper limit or a negative lower limit, the previously stored offset is increased which is added to or subtracted from the last detected value and the value of the counter is reset.

Figure 5:
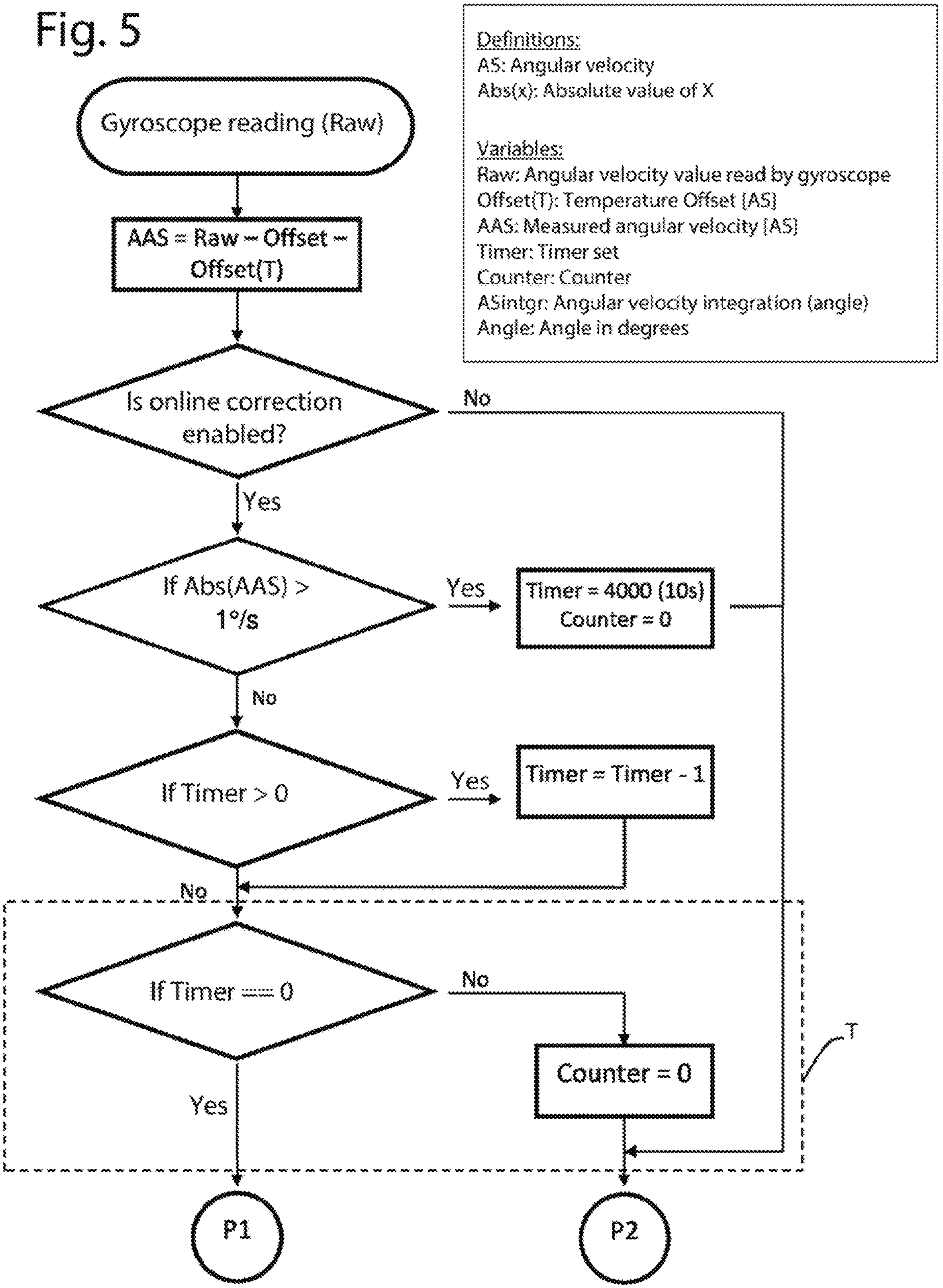
FIG. 5 shows a flow algorithm of the compensation method according to the present invention.
Figure 5:
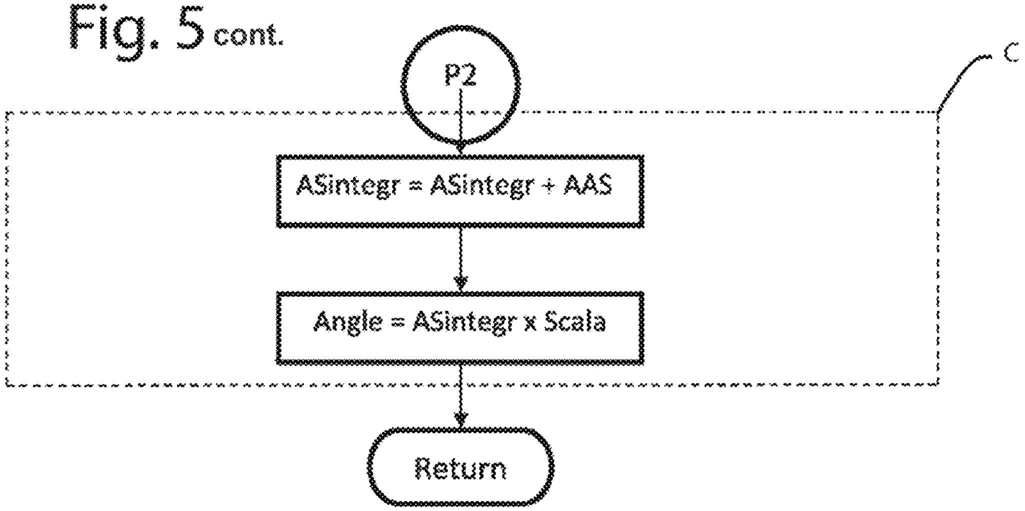
Figure 6:
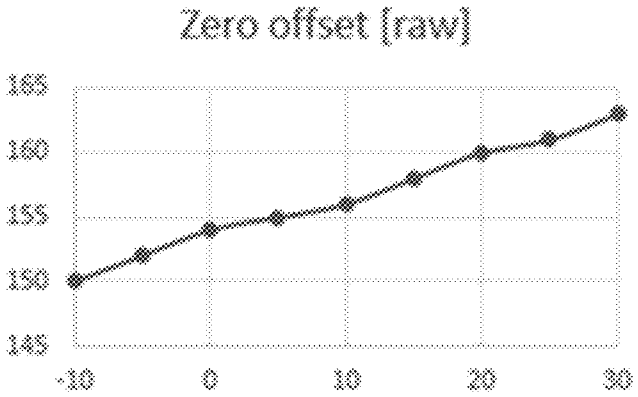

FIG. 5 illustrates a flow algorithm that operates according to the method for compensating for deviations (instant-by-instant correction) according to the present invention.

In this algorithm, in a first preliminary portion, part of the pre-setting is monitored, in addition to compensating for the effects of temperature as described above using the table of correspondence between temperature and the true zero angle signal provided by the gyroscope, when the wrench is active and in rest conditions (step AAS=Raw−Offset−Offset(T)), it is checked whether the online correction is enabled and if the wrench was not in a tightening operation (step Abs(AAS)> 1°/s).

If this is not the case, after carrying out a "countdown" using the pre-set timer (step T), you will move on to the actual online correction portion.

In particular, the angular velocity AAS is measured and compared instant-by-instant to understand if it increases or decreases over time by a pre-set threshold value (in this case e.g. 0.1 degrees per second). In the case of an increase above the threshold, the counter Count is increased, and in the case of a decrease above the threshold, the counter Count is decreased (step increase/decrease I)

When the absolute value of the counter exceeds this predetermined counter threshold (in the case in example 600), the offset is increased by 1 if the counter sign is negative and is decreased by one if the counter sign is positive, thus compensating in fact for the deviation from the real zero (offset RO recalculation step).

The last portion of the algorithm involves calculating the offset angle by integrating the AAS angular velocity value and relating it to the measurement scale (step C).

from the gyroscope.

The invention claimed is:

1. A wrench for applying a torque equipped with a sensor for measuring a tightening angle for use by an operator, comprising:

a body, containing control circuits and an electronic processing unit, the body having at one end a handle adapted for gripping by the operator, and at the other end an arm, a free end of said arm comprising a seat having a plurality of inserts adapted for alternatively engaging a tool with a corresponding type or size of a mechanical member to perform a tightening operation, a gyroscope on said arm for measuring the tightening angle, wherein the electronic processing unit is adapted to compensate for the deviations of the value of the received angle signal of the gyroscope, based on a compensation algorithm that corrects the value of the zero angle signal received from the gyroscope.

2. The wrench according to claim 1, wherein said electronic processing unit comprises a table of correspondence between temperature and true zero angle signal provided by the gyroscope, wherein the table is stored in said processing unit and obtained during a torque calibration phase, in which the wrench is subjected to temperature variations starting from a minimum value up to a maximum and during this period the angle signal is detected.

3. The wrench according to claim 2, in which the table is obtainable or corrected by self-learning, the wrench is equipped with a temperature sensor and is adapted to correct the table as the temperature sensor detects new values, during normal use different from those initially set.

4. The wrench according to claim 3, in which in said table the deviation between the real zero signal received and the theoretical one is stored for predetermined temperature values.

5. The wrench according to claim 3, wherein, when the tightening operation is performed at a measured temperature, the electronic processing unit compensates the measured angle value with the offset value stored in said table for that measured temperature.

6. The wrench according to claim 1, wherein said electronic processing unit monitors cyclically, at successive predetermined times the zero signal of the gyroscope itself and against a predetermined number of detected deviations of this signal with respect to the one previously detected above a predetermined threshold, reposition the zero of the gyroscope in correspondence with the last detected value.

7. The wrench according to claim 6, in which a counter is incremented at each increment of the received signal and the same counter is decremented at each decrement of the received signal, when said counter exceeds this predetermined positive or negative threshold of the last value detected by the gyroscope the value corresponding to zero degrees of rotation of the gyroscope is considered and the counter is reset.

8. The wrench according to claim 1, further comprising a temperature sensor.

9. A method for compensating for deviations in an angle signal measured by a gyroscope integrated in a torque wrench when said torque wrench is active and at rest, this method comprising the following steps:

during a calibration phase, subjecting the torque wrench to temperature variations starting from a minimum value up to a maximum value and, during this calibration phase, a calibration phase angle signal, which corresponds to a zero angle value, is detected by the gyroscope, during a tightening phase, subtracting the calibration phase angle signal from a value of a rotation angle signal received during rotation by the gyroscope at the current temperature measured by a temperature sensor of the torque wrench or gyroscope.

10. A method for compensating deviations in an angle signal measured by a gyroscope integrated in a torque wrench which includes a cyclic repetition of the following steps:

receiving at predetermined times an angle signal from the gyroscope which corresponds to a zero angle signal, when an increase in the angle signal is greater than a pre-set increment threshold, incrementing a counter and, when a decrement of the angle signal is greater than a pre-set decrement threshold, decrementing the counter, if the counter exceeds a positive upper limit or a negative lower limit, increasing a previously stored offset, adding or subtracting the previously stored offset from a last detected value of the counter, and resetting the counter.

* * * * *